US 8,421,609 B2

(12) United States Patent
Kim et al.

(10) Patent No.: US 8,421,609 B2
(45) Date of Patent: Apr. 16, 2013

(54) HAPTIC FEEDBACK DEVICE AND ELECTRONIC DEVICE HAVING THE SAME

(75) Inventors: Boum Seock Kim, Gyunggi-do (KR); Seung Gyo Jeong, Gyunggi-do (KR); Eun Tae Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 181 days.

(21) Appl. No.: 12/926,778

(22) Filed: Dec. 8, 2010

(65) Prior Publication Data
US 2012/0038470 A1 Feb. 16, 2012

(30) Foreign Application Priority Data

Aug. 13, 2010 (KR) .................. 10-2010-0078168

(51) Int. Cl.
*H04B 3/36* (2006.01)
(52) U.S. Cl.
USPC ............. 340/407.1; 340/407.2; 345/173; 345/156
(58) Field of Classification Search ........ 340/407.1, 340/407.2, 425.5; 345/173, 174, 156, 157, 345/168; 310/314, 331
See application file for complete search history.

(56) References Cited

U.S. PATENT DOCUMENTS

| | | | |
|---|---|---|---|
| 2002/0149561 A1* | 10/2002 | Fukumoto et al. ........... 345/156 |
| 2005/0264528 A1* | 12/2005 | Burry .......................... 345/157 |
| 2007/0152974 A1* | 7/2007 | Kim et al. ..................... 345/168 |
| 2008/0122315 A1* | 5/2008 | Maruyama et al. ........... 310/314 |
| 2008/0238884 A1* | 10/2008 | Harish ........................... 345/174 |
| 2009/0001855 A1* | 1/2009 | Lipton et al. .................. 310/331 |
| 2009/0267892 A1* | 10/2009 | Faubert ......................... 345/156 |
| 2010/0315354 A1* | 12/2010 | Park et al. ..................... 345/173 |
| 2011/0102326 A1* | 5/2011 | Casparian et al. ............ 345/168 |
| 2011/0187514 A1* | 8/2011 | Dong et al. ................... 340/407.1 |
| 2011/0187516 A1* | 8/2011 | Makinen et al. ........... 340/425.5 |
| 2011/0260843 A1* | 10/2011 | Woo et al. ................... 340/407.2 |
| 2011/0260995 A1* | 10/2011 | Woo et al. ..................... 345/173 |
| 2011/0310055 A1* | 12/2011 | An et al. ....................... 345/174 |
| 2012/0038470 A1* | 2/2012 | Kim et al. ................... 340/407.2 |
| 2012/0038471 A1* | 2/2012 | Kim et al. ................... 340/407.2 |
| 2012/0139850 A1* | 6/2012 | Kim et al. ..................... 345/173 |
| 2012/0139851 A1* | 6/2012 | Kim et al. ..................... 345/173 |
| 2012/0162143 A1* | 6/2012 | Kai et al. ....................... 345/177 |

FOREIGN PATENT DOCUMENTS

KR 10-2005-0038645 4/2005

* cited by examiner

Primary Examiner — Hoi Lau

(57) ABSTRACT

There is provided a haptic feedback device and an electronic device having the same. The haptic feedback device includes a display panel receiving contact pressure applied thereto; an actuator generating vibrations so as to give different types of haptic feedback according to a change in the contact pressure applied to the display panel; a support plate supporting the actuator; a bonding portion provided between an end portion of the actuator in a lengthwise direction thereof and the support plate so as to fix the actuator to the support plate; and a vibration space expanding portion formed to be recessed in a portion of the support plate corresponding to the actuator.

10 Claims, 3 Drawing Sheets

HAPTIC FEEDBACK DEVICE AND ELECTRONIC DEVICE HAVING THE SAME

CROSS-REFERENCE TO RELATED APPLICATIONS

This application claims the priority of Korean Patent Application No. 10-2010-0078168 filed on Aug. 13, 2010, in the Korean Intellectual Property Office, the disclosure of which is incorporated herein by reference.

BACKGROUND OF THE INVENTION

1. Field of the Invention

The present invention relates to a haptic feedback device and an electronic device having the same, and more particularly, to a haptic feedback device providing improved haptic feedback by ensuring a sufficiency of vibration space under an actuator and an electronic device having the same.

2. Description of the Related Art

Recently, the use of touch-type devices allowing for an inputting operation in electronic devices (or home appliances) through a touch (contact) operation has become generalized according to the demands of users who desire to use electronic appliances in a simpler manner.

Currently, a haptic feedback device follows the concept of providing an intuitive user interface experience and diversifying possible types of contact feedback, in addition to facilitating the concept of performing an inputting operation through touch.

The haptic feedback device has many advantages: it can save space, accomplish an improvement in manipulation and simplicity, allow for a simple change in specification, have a high level of user recognition, and have good interworkability with IT devices.

With such advantages, the haptic feedback device is commonly employed in electronic devices used in computers, traffic note issuing devices, public information services, medical equipment, mobile communications devices, and the like. In such electronic devices, a vibration motor has been employed as an actuator for implementing a haptic function. However, the vibration motor has a low reaction rate to a rapid touch. In order to increase the reaction rate, the use of a piezo actuator has been proposed.

A piezo-type haptic feedback device is configured in a manner such that a piezo actuator is fixed to a plate formed of steel use stainless (SUS) by applying an adhesive to a lower surface of the piezo actuator; the piezo actuator vibrates vertically when voltage is applied thereto; the vibrations of the piezo actuator are transferred to a touch panel disposed on an upper portion of the piezo actuator; and various types of haptic feedback are provided.

At this time, the vibrations of the piezo actuator are transferred to the adhesive and the plate disposed in a lower portion of the piezo actuator as well as to the touch panel disposed on the upper portion of the piezo actuator. Accordingly, the vibratory force of the piezo actuator is reduced due to the adhesive and the plate.

SUMMARY OF THE INVENTION

An aspect of the present invention provides a haptic feedback device providing improved haptic feedback by ensuring a sufficiency of vibration space under an actuator and an electronic device having the same.

According to an aspect of the present invention, there is provided a haptic feedback device including: a display panel receiving contact pressure applied thereto; an actuator generating vibrations so as to give different types of haptic feedback according to a change in the contact pressure applied to the display panel; a support plate supporting the actuator; a bonding portion provided between an end portion of the actuator in a lengthwise direction thereof and the support plate so as to fix the actuator to the support plate; and a vibration space expanding portion formed to be recessed in a portion of the support plate corresponding to the actuator.

The vibration space expanding portion may have a depth equal to half of an amplitude of the actuator.

The vibration space expanding portion may have a uniform depth.

The vibration space expanding portion may have an inclined bottom surface.

The actuator may be a piezo actuator or a polymer actuator.

According to another aspect of the present invention, there is provided an electronic device including the haptic feedback device as described above, and a case accommodating the haptic feedback device to be disposed therein.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
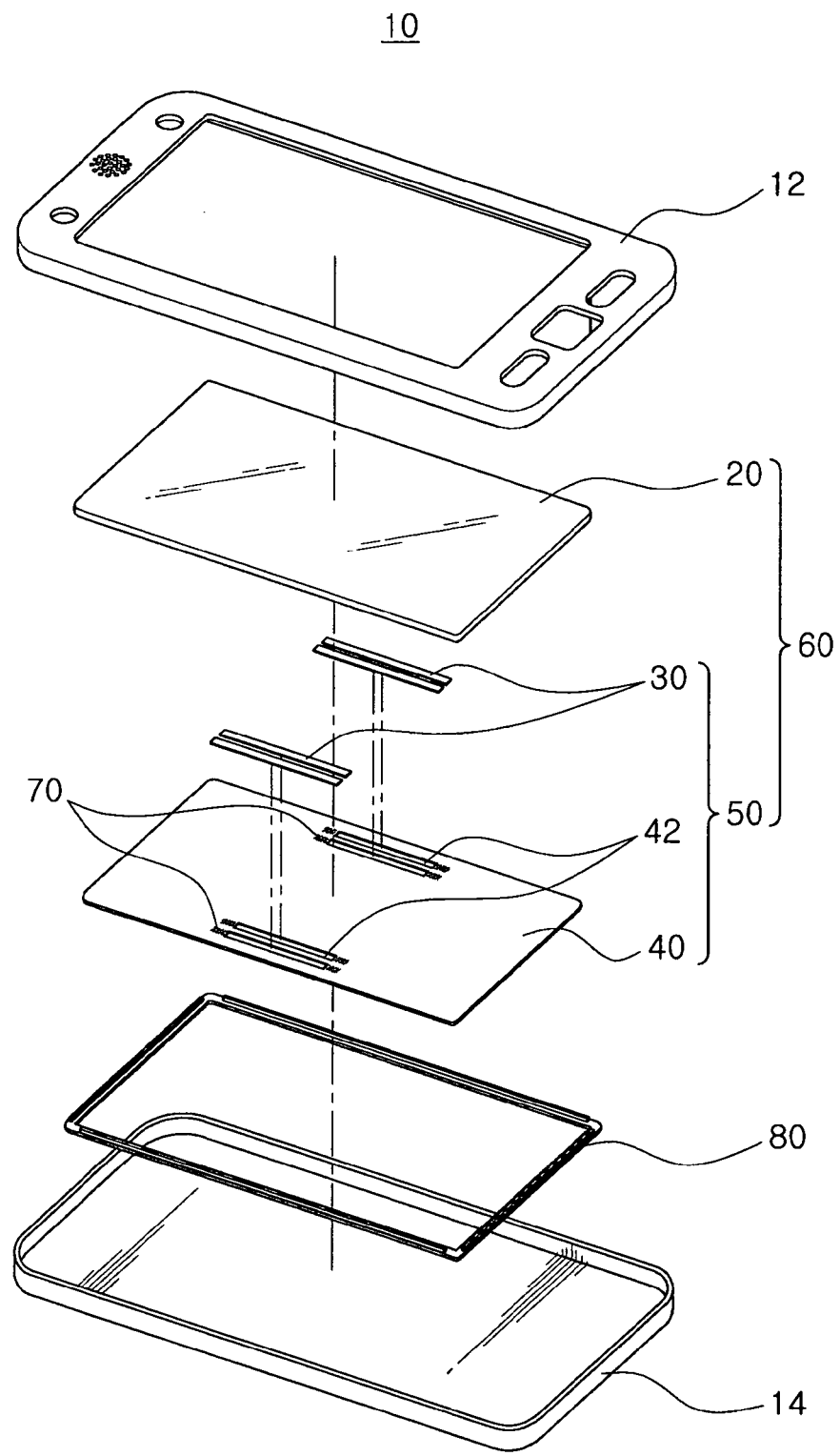
FIG. 1 is an exploded perspective view of an electronic device having a haptic feedback device according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like elements.

Figure 2A:
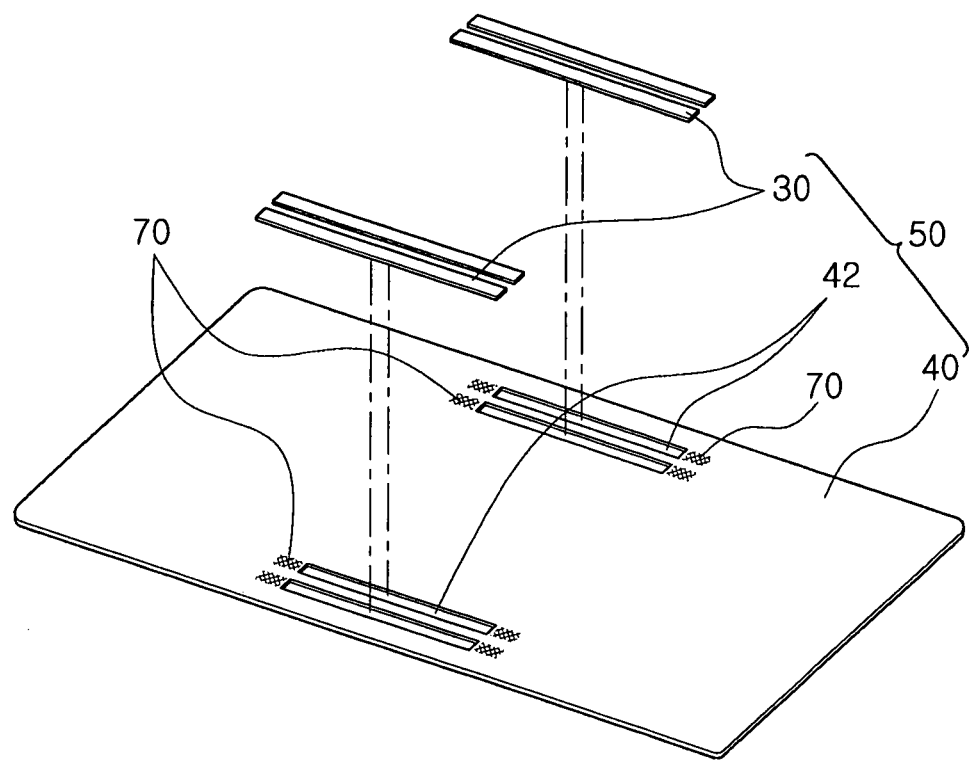
FIGS. 2A and 2B are an enlarged exploded perspective view and a plan view of a haptic feedback actuator, respectively, according to an exemplary embodiment of the present invention.
Figure 2B:
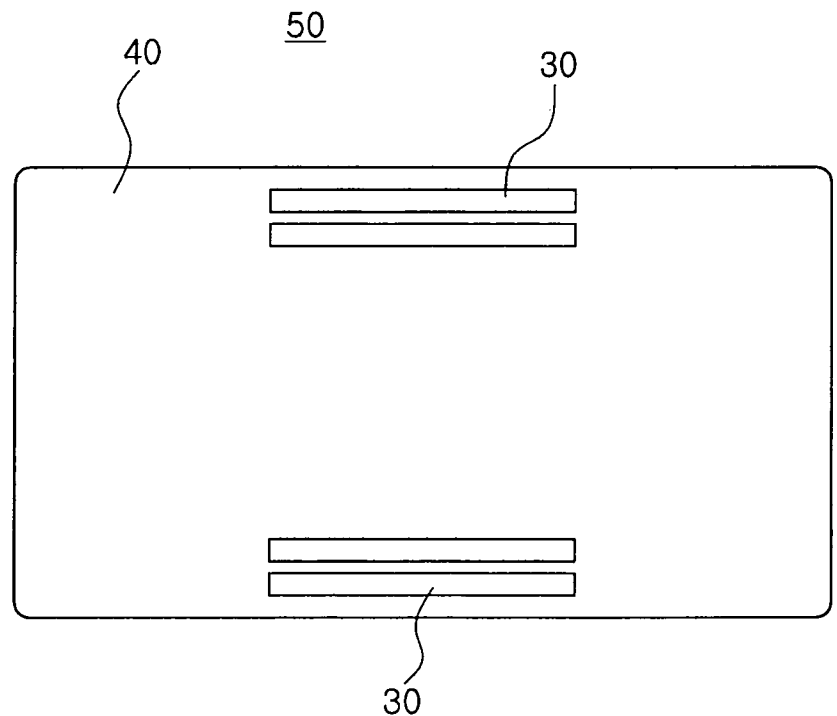
Figure 3:
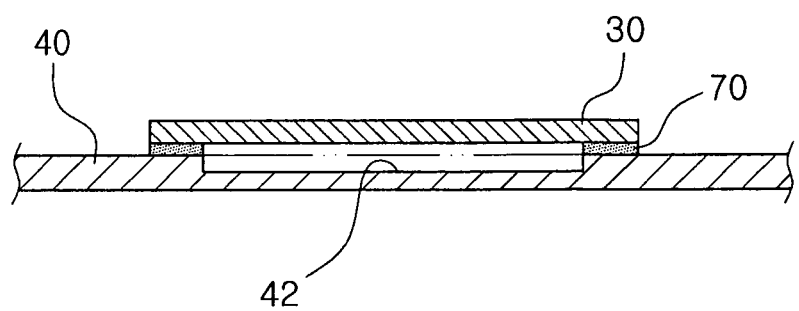
FIG. 3 is a vertical cross-sectional view of a haptic feedback actuator in a thickness direction thereof according to an exemplary embodiment of the present invention.

FIG. 1 is an exploded perspective view of an electronic device having a haptic feedback device according to an exemplary embodiment of the present invention. FIGS. 2A and 2B are an enlarged exploded perspective view and a plan view of a haptic feedback actuator, respectively, according to an exemplary embodiment of the present invention. FIG. 3 is a vertical cross-sectional view of a haptic feedback actuator in a thickness direction thereof according to an exemplary embodiment of the present invention.

In the following description, a mobile communications terminal 10 will be taken as an electronic device according to an exemplary embodiment of the invention, but without being limited thereto, the electronic device may be also applicable to a general haptic device generating a change in vibrations according to user contact with devices such as various OA devices, medical equipment, mobile communications devices, traffic note issuing devices, and the like.

Hereinafter, the mobile communications terminal 10 as an example of an electronic device will now be described in detail.

With reference to FIGS. 1 through 3, the mobile communications terminal 10, which is an electronic device according to an exemplary embodiment of the invention, may include a case 12 and 14 and a haptic feedback device 60.

The case 12 and 14 may include a front case portion 12 and a rear case portion 14. The front case portion 12 and the rear case portion 14 may be coupled to form an internal space therebetween.

The haptic feedback device 60 may be disposed in the internal space by being inserted into a rubber ring 80. A circuit board (not shown) that can drive a haptic feedback actuator 50 of the haptic feedback device 60 may be mounted in the internal space.

Here, the haptic feedback device 60 may include a haptic device 20 and the haptic feedback actuator 50.

In the mobile communications terminal 10 that is the electronic device according to the present embodiment, a display panel 20 providing an image is employed as the haptic device. Namely, when contact pressure is changed according to a contact applied to the display panel 20, the display panel 20 reacts haptically to the contact.

The display panel 20 may include a touch screen panel (not shown) and an image display portion (not shown). The touch screen panel formed on an outer surface of the display panel 20 is formed by stacking an outer film layer, an indium tin oxide (ITO) film layer and a base film layer.

Also, the image display portion is disposed on a bottom surface of the touch screen panel. The image display portion emits light to a front surface of the mobile communications terminal 10. At this time, one of a liquid crystal display (LCD) and a plasma display panel (PDP) may be alternatively employed as the image display portion.

The haptic feedback actuator 50 may include an actuator 30 and a support plate 40. Also, the haptic feedback device 60 may include the display panel 20 receiving contact pressure applied thereto and the haptic feedback actuator 50 causing the display panel 20 to vibrate.

The actuator 30 may be configured as a piezo actuator or a polymer actuator. The actuator 30 may generate vibrations in order that a user may be provided with different types of haptic feedback according to a change in contact pressure with the display panel 20.

The magnitude of vibrations and the number of vibrations (amount of vibrations, vibration frequency) of the actuator 30 may be determined by a controller (not shown) provided on the circuit board. At this time, the controller may control a change in the application of voltage in such a manner as to make variations in the magnitude of vibrations (vibratory force) and the number of vibrations.

The actuator 30 may be a bar-shaped ceramic stacked body including ceramic layers and an electrode interposed between the ceramic layers, and polarizations of the ceramic layers may be formed in the same direction.

The support plate 40 supports the actuator 30. A bonding portion 70 is formed between the support plate 40 and the actuator 30 so as to fix the actuator 30 to the support plate 40.

The bonding portions 70 may be formed by applying an adhesive to end portions of the actuator 30 in a lengthwise direction thereof. At this time, the adhesive may have high adhesive strength in order to allow the actuator 30 to be steadily fixed to the support plate 40. For example, a thermosetting adhesive capable of maintaining variation rigidity while having high adhesive strength may be used.

In the present embodiment, the adhesive is applied to the end portions of the actuator 30 in the lengthwise direction thereof. However, the invention is not limited thereto. The adhesive may be applied to a central portion of the actuator 30 in the lengthwise direction thereof. A change in design specification may be made in various manners.

In the present embodiment, only the bonding of the actuator 30 and the support plate 40 is described. However, the invention is not limited thereto. An adhesive may also be applied between the actuator 30 and the display panel 20 so that they can be adhered to each other. At this time, the adhesive may allow for the transfer of the vibrations generated in the actuator 30 to the display panel 20. For example, an anaerobic adhesive such as a UV adhesive may be used.

The actuator 30 may include two pairs of bar-shaped piezoelectric elements, the two pairs being respectively arranged in parallel along both sides of the support plate 40 in a widthwise direction thereof. Here, the piezoelectric elements in each pair are arranged to have a predetermined gap therebetween. Meanwhile, the invention is not limited thereto, and the arrangement of the actuator may be modified in various manners according to required conditions. For example, two bar-shaped piezoelectric elements may be arranged in a row to have a gap therebetween in a lengthwise direction of the support plate 40 in each of the sides of the support plate 40 in the widthwise direction thereof.

Herein, the actuator 30 has elasticity in the lengthwise direction thereof, while the support plate 40 is formed of a material unable to change in length. For this reason, the actuator 30 vibrates vertically in a thickness direction thereof, rather than in a direction of the elasticity thereof.

Therefore, since the actuator 30 vibrates vertically in the thickness direction thereof, greater vibratory force may be transferred to the display panel 20 as compared with a case in which the actuator 30 vibrates in the lengthwise direction thereof.

In a portion of the support plate 40 corresponding to the actuator 30, a vibration space expanding portion 42 may be formed to be recessed in a thickness direction of the support plate 40.

That is, when the actuator 30 vibrates vertically in the thickness direction thereof while voltage is applied thereto, the vibration space expanding portion 42 may prevent the vibrations of the actuator 30 from being damped by the support plate 40 under the actuator 30. Accordingly, the magnitude of vibrations transferred to the display panel 20 is greatly increased.

The vibration space expanding portion 42 may be formed by etching the support plate 40, and may have a depth equal to half of the amplitude of the actuator 30.

For example, in the case that the amplitude of the actuator 30 is 24 μm, the vibration space expanding portion 42 may be etched to have a depth of 12 μm. At this time, the thickness of the bonding portion 70 may be 1 μm to 2 μm, which is relatively less than the amplitude of the actuator 30. Even taking this into consideration, in order to ensure a sufficiency of vibration space for the actuator 30, the vibration space expanding portion 42 may be designed to have a depth equal to half of the amplitude of the actuator 30.

The vibration space expanding portion 42 may be formed in a portion of the support plate 40 except for the bonding portions 70 between the actuator 30 and the support plate 40. As described in the present embodiment, in the case that the bonding portions 70 are formed on the end portions of the actuator 30 in the lengthwise direction thereof, the vibration space expanding portion 42 may be formed to have a uniform depth in the portion of the support plate 40 except for the bonding portions 70.

Meanwhile, in the present embodiment, the direct transfer of the vibrations generated in the actuator 30 to the display panel 20 is described. However, the invention is not limited thereto. A vibration plate may be interposed between the display panel 20 and the actuator 30 in order to amplify vibrations or alleviate an impact with respect to vibrations in the transfer of the vibrations to the display panel 20.

Figure 4:
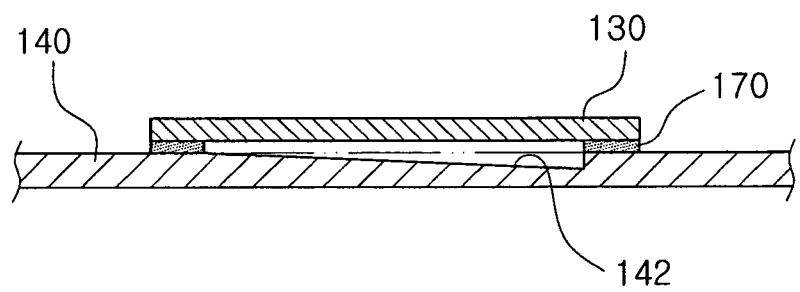
FIG. 4 is a vertical cross-sectional view of a haptic feedback actuator in a thickness direction thereof according to another exemplary embodiment of the present invention.

FIG. 4 is a vertical cross-sectional view of a haptic feedback actuator in a thickness direction thereof according to another exemplary embodiment of the present invention.

As shown in FIG. 4, a haptic feedback actuator according to another exemplary embodiment of the invention may include a vibration space expanding portion having its bottom surface inclined. With the exception of this feature, the haptic feedback actuator illustrated in FIG. 4 is substantially the same as that illustrated in FIG. 1, so a detailed description thereof will be omitted. Hereinafter, a different feature will be described in detail.

With reference to FIG. 4, the haptic feedback actuator according to another exemplary embodiment of the invention may include a vibration space expanding portion 142 having its bottom surface downwardly inclined in a direction from one of bonding portions 170 formed in both end portions of an actuator 130 in a lengthwise direction thereof toward the other thereof. This is designed in consideration of a case in which the vibrations of the actuator 130 are generated from one of the bonding portions 170 and the amplitude thereof is gradually increased in a direction from one of the bonding portions 170 toward the other thereof.

In the present embodiment, the bonding portions 170 are formed on the both end portions of the actuator 130 in the lengthwise direction thereof. However, the invention is not limited thereto. In the case that the bonding portion 170 is formed in a central portion of the actuator 130 in the lengthwise direction thereof, the vibration space expanding portion 142 may have a bottom surface downwardly inclined from the bonding portion 170 toward both ends thereof.

This is designed in consideration of a case in which the actuator has an amplitude increasing toward both end portions thereof due to its degree of freedom increasing in a direction toward the both end portions from the bonding portion placed on the central portion of the actuator in the lengthwise direction thereof.

As set forth above, a haptic feedback device and an electronic device having the same according to exemplary embodiments of the invention can provide a user with improved haptic feedback through feedback having greater vibratory force.

While the present invention has been shown and described in connection with the exemplary embodiments, it will be apparent to those skilled in the art that modifications and variations can be made without departing from the spirit and scope of the invention as defined by the appended claims.

What is claimed is:

1. A haptic feedback device comprising:
a display panel receiving contact pressure applied thereto;
an actuator generating vibrations so as to give different types of haptic feedback according to a change in the contact pressure applied to the display panel, the actuator being formed of a bar-shaped ceramic stacked body including ceramic layers and an electrode interposed between the ceramic layers and having a uniform thickness in a lengthwise direction;
a support plate supporting the actuator;
a bonding portion provided between an end portion of the actuator in a lengthwise direction thereof and the support plate so as to fix the actuator to the support plate; and
a vibration space expanding portion formed to be recessed in a portion of the support plate corresponding to a portion of the actuator less than the entire actuator.

2. A haptic feedback device comprising:
a display panel receiving contact pressure applied thereto;
an actuator generating vibrations so as to give different types of haptic feedback according to a change in the contact pressure applied to the display panel;
a support plate supporting the actuator;
a bonding portion provided between an end portion of the actuator in a lengthwise direction thereof and the support plate so as to fix the actuator to the support plate; and
a vibration space expanding portion formed to be recessed in a portion of the support plate corresponding to the actuator,
the vibration space expanding portion having a depth equal to half of an amplitude of the actuator.

3. The haptic feedback device of claim 1, wherein the vibration space expanding portion has a uniform depth.

4. A haptic feedback device comprising:
a display panel receiving contact pressure applied thereto;
an actuator generating vibrations so as to give different types of haptic feedback according to a change in the contact pressure applied to the display panel;
a support plate supporting the actuator;
a bonding portion provided between an end portion of the actuator in a lengthwise direction thereof and the support plate so as to fix the actuator to the support plate; and
a vibration space expanding portion formed to be recessed in a portion of the support plate corresponding to the actuator,
the vibration space expanding portion having an inclined bottom surface.

5. The haptic feedback device of claim 1, wherein the actuator is a piezo actuator or a polymer actuator.

6. An electronic device comprising:
a case having an internal space formed therein; and
a haptic feedback device accommodated to be disposed within the case, the haptic feedback device comprising
a display panel receiving contact pressure applied thereto,
an actuator generating vibrations so as to give different types of haptic feedback according to a change in the contact pressure applied to the display panel, the actuator being formed of a bar-shaped ceramic stacked body including ceramic layers and an electrode interposed between the ceramic layers and having a uniform thickness in a lengthwise direction,
a support plate supporting the actuator,
a bonding portion provided between an end portion of the actuator in a lengthwise direction thereof and the support plate so as to fix the actuator to the support plate, and
a vibration space expanding portion formed to be recessed in a portion of the support plate corresponding to a portion of the actuator less than the entire actuator.

7. An electronic device comprising:
a case having an internal space formed therein; and
a haptic feedback device accommodated to be disposed within the case, the haptic feedback device comprising:
   a display panel receiving contact pressure applied thereto;
   an actuator generating vibrations so as to give different types of haptic feedback according to a change in the contact pressure applied to the display panel;
   a support plate supporting the actuator;
   a bonding portion provided between an end portion of the actuator in a lengthwise direction thereof and the support plate so as to fix the actuator to the support plate; and
   a vibration space expanding portion formed to be recessed in a portion of the support plate corresponding to the actuator,
   the vibration space expanding portion having a depth equal to half of an amplitude of the actuator.

8. The electronic device of claim 6, wherein the vibration space expanding portion has a uniform depth.

9. An electronic device comprising:
a case having an internal space formed therein; and a haptic feedback device accommodated to be disposed within the case, the haptic feedback device comprising:
   a display panel receiving contact pressure applied thereto;
   an actuator generating vibrations so as to give different types of haptic feedback according to a change in the contact pressure applied to the display panel;
   a support plate supporting the actuator;
   a bonding portion provided between an end portion of the actuator in a lengthwise direction thereof and the support plate so as to fix the actuator to the support plate; and
   a vibration space expanding portion formed to be recessed in a portion of the support plate corresponding to the actuator,
   the vibration space expanding portion having an inclined bottom surface.

10. The electronic device of claim 6, wherein the actuator is a piezo actuator or a polymer actuator.

* * * * *